G. STEERUP.
STORAGE BATTERY SEPARATOR.
APPLICATION FILED JAN. 29, 1919.

1,403,577. Patented Jan. 17, 1922.

WITNESS:
Stewart Holmes
Ralph Munden

INVENTOR.
Godfrey Steerup.
BY
Raymond H. Van Vleet
ATTORNEY.

UNITED STATES PATENT OFFICE.

GODFREY STEERUP, OF CHICAGO, ILLINOIS, ASSIGNOR TO U. S. LIGHT & HEAT CORPORATION, OF NIAGARA FALLS, NEW YORK, A CORPORATION OF NEW YORK.

STORAGE-BATTERY SEPARATOR.

1,403,577.      Specification of Letters Patent.      Patented Jan. 17, 1922.

Application filed January 29, 1919. Serial No. 273,747.

*To all whom it may concern:*

Be it known that I, GODFREY STEERUP, a citizen of the United States, residing at Chicago, in the county of Cook and State of Illinois, have invented new and useful Improvements in Storage-Battery Separators, of which the following is a specification.

The present invention relates to storage battery separators.

More particularly the present invention relates to an improved separator which will permit circulation of the electrolyte in the storage battery cell while preventing short-circuiting from a plate of one polarity to one of the opposite polarity.

An object of the present invention is to provide a storage battery separator which will be sturdy and which will remain in good condition for long periods of time.

A further object is to provide a storage battery separator which will be cheap to manufacture as well as reliable in operation.

Referring to the drawings, Figure 1 represents a fragmentary view in elevation of a storage battery separator according to the present invention.

Figure 2:
Figure 2 represents a view in cross section of a separator.
Figure 1:
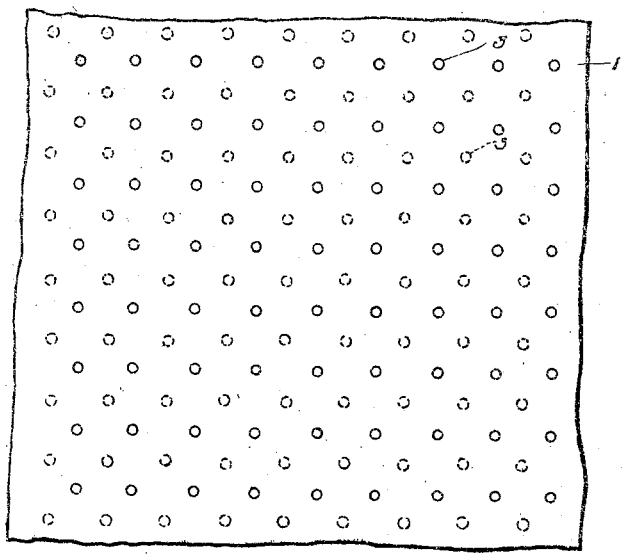

According to the embodiment of the present invention illustrated in Figs. 1 and 2, a pair of thin sheets of acid-resisting material 1, 1, are provided. These two sheets 1, 1, may be of rubber or of any other material which has the necessary stiffness. Said sheets 1, 1 should be of insulating material. These two sheets of insulating material 1, 1 are juxtaposed. That is to say, they are placed side by side in parallel relation. As illustrated in Fig. 2, the sheets 1, 1 are separated by an intermediate mat 2. This mat may be of cellulose material, as for instance, wood, cardboard, or it may be of cloth or asbestos. Many other materials may be chosen to constitute the mat 2, so long as they permit the passage of liquid therethrough.

Each sheet 1, 1 is perforated at a number of points, preferably symmetrically placed, but when these sheets are placed in parallel relation to form a storage battery separator, these perforations, which are indicated by the numeral 3, should be out of line with one another, that is to say, the perforations 3 in one sheet should be out of register with the perforations on the complementary sheet. Expressed in a slightly different way, the perforations of one sheet should be staggered relative to those of the complementary sheet. This construction results in a circuitous path for the electrolyte through the separator. This path through a perforation in one sheet toward a perforation in the complementary sheet may be vertical, horizontal or at any angle between the vertical and horizontal.

If preferred, the mat 2 may be omitted, the sheets 1, 1 being placed in contact with one another. I have noted that when two sheets of rubber or similar material are wet, they will cling together throughout their juxtaposed areas. The same clinging effect or attraction is present between the rubber sheet 1 and the mat 2. The mat 2 between the sheets 1, 1, or the space between the sheets 1, 1, if no mat is used, provides a capillary space for the passage of the electrolyte. In practice, the electrolyte may pass from one side of the separator to the other, while any sediment or other solid material will be stopped. Short-circuiting between the plates will therefore be prevented.

Figure 3:
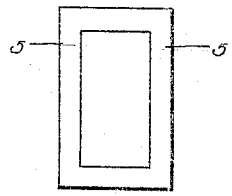
Figures 3 and 4 represent holding devices.
Figure 4:
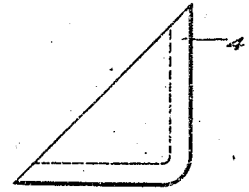

The parts of the separator may be held together by means of clips at the corners or along opposite sides. The nature of these clips is immaterial but they may be of hard rubber or other acid-resisting material. A clip which will be found satisfactory is illustrated in Figs. 3 and 4. This clip is indicated by the numeral 4 and comprises a pocket-shaped piece of material providing side walls 5, 5, adapted to embrace the sheets 1, 1 and hold same together. If preferred, the clips 4 may be dispensed with and the parts of the separator held together by other means, as for instance, sealing compound. It will be understood that the illustrations are not drawn to scale and are not intended to give any indication of relative size of perforations and distance therebetween. The dimensions may be varied as desired, without departing from the present invention. Many other modifications may be made which will not depart from the invention. The patent is intended to cover all such modifications that come within the scope of the appended claims.

What I claim as new and desire to secure by Letters Patent of the United States, is—

1. In a battery separator, in combination, a plurality of juxtaposed thin sheets of material which cling together when wet, the outside sheets being perforated, there being only capillary passageways from perforations of one of said sheets to the perforations of other of said sheets.

2. In a battery separator, in combination, outer sheets of perforated relatively stiff material and an inner sheet of cellular material, there being only capillary passageways from perforations of one of said sheets to the perforations of other of said sheets.

3. In a battery separator, in combination, a pair of perforated sheets of electrolyte resisting material, said sheets being juxtaposed with the perforations of one sheet out of register with the other sheet, there being only capillary passage-ways between perforations of said sheets.

4. In a battery separator, in combination, a plurality of juxtaposed thin sheets of material which cling together when wet, the outside sheets being perforated, the perforations of one of said outside sheets being out of line with the perforations of the other outside sheet, there being only capillary passage-ways from perforations of one of said sheets to the perforations of other of said sheets.

In witness whereof, I have hereunto subscribed my name.

GODFREY STEERUP.